US011422516B2

(12) United States Patent
Bhattacharya et al.

(10) Patent No.: US 11,422,516 B2
(45) Date of Patent: Aug. 23, 2022

(54) BUILDING MANAGEMENT SYSTEM WITH DYNAMIC RULES WITH SUB-RULE REUSE AND EQUATION DRIVEN SMART DIAGNOSTICS

(71) Applicant: Johnson Controls Tyco IP Holdings LLP, Milwaukee, WI (US)

(72) Inventors: Subrata Bhattacharya, Navi Mubai (IN); Braja Majumdar, Hooghly (IN); Rajesh C. Nayak, Karnataka (IN); Abhigyan Chatterjee, West Bengal (IN); Jayesh Shirish Patil, West Mumbai (IN)

(73) Assignee: JOHNSON CONTROLS TYCO IP HOLDINGS LLP, Milwaukee, WI (US)

(*) Notice: Subject to any disclaimer, the term of this patent is extended or adjusted under 35 U.S.C. 154(b) by 957 days.

(21) Appl. No.: 15/892,274

(22) Filed: Feb. 8, 2018

(65) Prior Publication Data

US 2019/0025776 A1 Jan. 24, 2019

(30) Foreign Application Priority Data

Jul. 21, 2017 (IN) .............................. 201741025951

(51) Int. Cl.
*G05B 15/02* (2006.01)
*G06Q 10/06* (2012.01)
(Continued)

(52) U.S. Cl.
CPC .......... *G05B 15/02* (2013.01); *G05B 23/0227* (2013.01); *G05B 23/0275* (2013.01);
(Continued)

(58) Field of Classification Search
CPC ............... G05B 23/0275; G06Q 10/20; G06Q 10/06312
See application file for complete search history.

(56) References Cited

U.S. PATENT DOCUMENTS 9,471,452 B2 10/2016 Mcelhinney et al.
2002/0026537 A1 2/2002 Schlabach et al.
(Continued)

OTHER PUBLICATIONS

Xue-Bin Yang, Xin-Qiao Jin, Zhi-Min Du, Yong-Hua Zhu, Yi-Bo Guo, A hybrid model-based fault detection strategy for air handling unit sensors, Energy and Buildings, 2013 (Year: 2013).*
(Continued)

*Primary Examiner* — Maria C Santos-Diaz
(74) *Attorney, Agent, or Firm* — Foley & Lardner LLP

(57) ABSTRACT

A building management system for monitoring equipment status is provided. The building management system includes a processing circuit configured to generate one or more constants for a piece of building equipment based on thresholds and device specific templates. The constants are equation based relationships between a value and a threshold. The processing circuit is further configured to generate one or more sub-rules based on the one or more constants and one or more equipment points. The sub-rules are equation based relationships between the one or more constants and the one or more equipment points. The processing circuit is further configured to generate a rule based on the one or more sub-rules and the one or more equipment points. The rule is an equation based relationship between the one or more sub-rules and the one or more equipment points and indicates whether the piece of building equipment is experiencing a fault.

17 Claims, 12 Drawing Sheets

(51) Int. Cl.
*G06N 5/04* (2006.01)
*G05B 23/02* (2006.01)

(52) U.S. Cl.
CPC ..... *G06N 5/046* (2013.01); *G06Q 10/063112* (2013.01); *G05B 2219/24053* (2013.01); *G05B 2219/2614* (2013.01)

(56) References Cited

U.S. PATENT DOCUMENTS

| | | |
|---|---|---|
| 2003/0164942 A1 | 9/2003 | Take |
| 2005/0171661 A1 | 8/2005 | Abdel-Malek et al. |
| 2006/0053357 A1* | 3/2006 | Rajski .............. G01R 31/31835 714/742 |
| 2007/0067678 A1* | 3/2007 | Hosek ................ G05B 23/0235 714/25 |
| 2011/0015962 A1 | 1/2011 | Finucan |
| 2011/0178977 A1* | 7/2011 | Drees ..................... G05B 15/02 706/52 |
| 2012/0310602 A1 | 12/2012 | Jacobi et al. |
| 2014/0172371 A1* | 6/2014 | Zhu .................... G06F 11/0703 702/185 |
| 2015/0235141 A1 | 8/2015 | Rensing et al. |
| 2016/0078695 A1 | 3/2016 | Mcclintic et al. |
| 2017/0108856 A1* | 4/2017 | Singh ................ G05B 23/0227 |
| 2017/0206509 A1 | 7/2017 | Beyk et al. |
| 2017/0357225 A1* | 12/2017 | Asp ....................... G05B 15/02 |

OTHER PUBLICATIONS

Baoping Cai, Yonghong Liu, Qian Fan, Yunwei Zhang, Zengkai Liu, Shilin Yu, Renjie Ji, Multi-source information fusion based fault diagnosis of ground-source heat pump using Bayesian network, Applied Energy, 2014 (Year: 2014).*

Zhao, Y., Wen, J., Xiao, F., Yang, X., & Wang, S. . Diagnostic bayesian networks for diagnosing air handling units faults—part I: Faults in dampers, fans, filters and sensors (2017) (Year: 2017).*

F. Zhou, L. Xia, W. Dong, X. Sun, X. Yan and Q. Zhao, "Fault diagnosis of high-speed railway turnout based on support vector machine," 2016 IEEE International Conference on Industrial Technology (ICIT), 2016, pp. 1539-1544, doi: 10.1109/ICIT.2016. 7474989. (Year: 2016).*

Search Report for International Application No. PCT/US2018/017477, dated May 3, 2018, 14 pages.

Search Report for International Application No. PCT/US2018/017480, dated May 3, 2018, 14 pages.

European Office Action on EP Appl. No. 18706617.0 dated Nov. 11, 2021 (5 pages).

European Office Action on EP Appl. No. 18706618.8 dated Nov. 11, 2021 (4 pages).

Amaya et al., "Expert System for Power Generation Fault Diagnosis using Hierarchical Meta-Rules," Proceedings of 2012 IEEE 17th International Conference on Emerging Technologies & Factory Automation, 2012 (8 pages).

* cited by examiner

| Fault | Diagnostics | Reason | Energy FDD |

Create fault

| Equipment category* | Air Handling Unit ▸ | Equipment type* | 1 checked ▸ |
| Fault category* | Building pressurization ▸ | Parameter value* | High Building Static Pressure ▸ |
| Fault detection* | Enable ▸ | Category* | Internal rule ▸ |
| Version* | Base line ▸ | Rule category* | Performance ▸ |
| Time delay (In min)* | 60 | Equation name* | AHU-FD-002 High Static Pressure |
| | | Brief equation description* | Detects high supply air static pressure by comparing with set point |

Equation statement*

(AHU Operational>0) AND (Supply Air Pressure Higher Than Supply Air Pressure Set Point>0)

| ( | ) | / | == | AND | Constant / Numeric Value |
| < | > | >= | + | * | OR | NOT | ◂ ▸ | ENTER |

TX (X) [      ] ENTER  00:00 ◂▸ ENTER

| Attribute | Constants | Sub rules |
| Mixed Air Pressure |
| Supply Air Static Pressure |
| Supply Air Humidity |
| Supply Air Differential Pressure |
| Filter Differential Pressure |
| Supply Air Temperature |
| Cooling Output |
| Outdoor Air Damper Output |

| Attribute | Value |
| AHU Operational | |
| Supply Air Pressure Higher Than Supply Air Pressure Set Point | |

FIG. 8

| Fault | Diagnostics | Reason | Energy FDD |

Create fault

| Equipment category* | Air Handling Unit ▶ | Equipment type* | 1 checked ▶ |
| Fault category* | Indoor Air Quality (Cooling & Heating mode) ▶ | Parameter value* | Poor IAQ ▶ |
| | | Category* | Internal rule ▶ |
| Fault detection* | Enable ▶ | Rule category* | Fault |
| Version* | Base line | Equation name* | AHU-FD-006 Poor Indoor Air Quality |
| Time delay (In min)* | 60 | Brief equation description* | Detects air quality based on carbon dioxide value |

Equation statement*  (AHU Operational>0) AND (Poor Air Quality>0)

[ ( ] [ <= ] [ - ] [ / ] [ == ] [ AND ]  Constant / Numeric Value
[ ) ] [ >= ] [ + ] [ * ] [ OR ] [ NOT ]  [ENTER]
[ < ] [ > ] [ENTER] [ 00:00 ◆ ] [ENTER]
TX (X)

| Attribute | Constants | Sub rules |
| Mixed Air Pressure |
| Supply Air Static Pressure |
| Supply Air Humidity |
| Supply Air Differential Pressure |
| Filter Differential Pressure |
| Supply Air Temperature |
| Cooling Output |
| Outdoor Air Damper Output |

| Attribute | Value |
| AHU Operational | |
| Poor Indoor Air Quality | |

FIG. 9

BUILDING MANAGEMENT SYSTEM WITH DYNAMIC RULES WITH SUB-RULE REUSE AND EQUATION DRIVEN SMART DIAGNOSTICS

CROSS REFERENCE TO RELATED PATENT APPLICATIONS

This application claims the benefit of and the priority to Indian Provisional Patent Application No. 2017/41025951 filed Jul. 21, 2017, the entire disclosure of which is incorporated by reference herein.

BACKGROUND

The present disclosure relates generally to the field of building management systems. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. Specifically, the present disclosure relates to a BMS with an equipment monitoring system to easily determine when the BMS is experiencing a fault.

SUMMARY

One implementation of the present disclosure is a building management system for monitoring equipment status, the building management system comprising a processing circuit. The processing circuit is configured to generate one or more constants for a piece of building equipment based on thresholds and device specific templates, wherein the constants are equation based relationships between a value and a threshold. The processing circuit is further configured to generate one or more sub-rules based on the one or more constants, wherein the sub-rules are equation based relationships between the one or more constants. The processing circuit is further configured to generate a rule based on the one or more sub-rules, wherein the rule is an equation based relationship between the one or more sub-rules and indicates whether the piece of building equipment is experiencing a fault.

In some embodiments, the processing circuit of the building management system is further configured to identify a fault for the building equipment based on the rule and measured values for the building equipment.

In some embodiments, the processing circuit of the building management system is further configured to determine one or more diagnostics based on a fault by identifying the fault for the building equipment based on the rule and measured values for the building equipment, determining sub-rules and constants that the rule is based on that are responsible for indicating the fault, and generating a diagnostic based on the determined sub-rules and constants.

In some embodiments, the processing circuit of the building management system is further configured to determine reasons for the fault occurring based on the determined sub-rules and constants and one or more fault reasons associated with the determined sub-rules and constants.

In some embodiments, the processing circuit of the building management system is further configured to generate a plurality of rules based on the one or more sub-rules, determine a plurality of faults based on the plurality rules and determine the length of time that the fault has been active, and generate a plurality of diagnostics based on the one or more faults.

In some embodiments, the processing circuit of the building management system is further configured to generate a diagnostic list comprising the plurality diagnostics ordered based on the determined length of time that each of the faults associated with the diagnostic has been active.

In some embodiments, the processing circuit of the building management system is further configured to generate a work order for one of the plurality of faults in response to determining that the fault has existed for at least a predefined amount of time or that the fault has occurred for at least a predefined number of times.

Another implementation of the present disclosure is a method for monitoring equipment status by a building management system. The method includes generating, by a processing circuit, one or more constants for a piece of building equipment based on thresholds and device specific templates, wherein the constants are equation based relationships between a value and a threshold. The method further includes generating, by the processing circuit, one or more sub-rules based on the one or more constants, wherein the sub-rules are equation based relationships between the one or more constants. The method further includes generating, by the processing circuit, a rule based on the one or more sub-rules, wherein the rule is an equation based relationship between the one or more sub-rules and indicates whether the piece of building equipment is experiencing a fault.

In some embodiments, the method further includes identifying a fault for the building equipment based on the rule and measured values for the building equipment.

In some embodiments, the method further includes determining one or more diagnostics based on a fault by identifying the fault for the building equipment based on the rule and measured values for the building equipment, determining sub-rules and constants that the rule is based on that are responsible for indicating the fault, and generating a diagnostic based on the determined sub-rules and constants.

In some embodiments, the method further includes determining reasons for the fault occurring based on the determined sub-rules and constants and one or more fault reasons associated with the determined sub-rules and constants.

In some embodiments, the method further includes generating a plurality of rules based on the one or more sub-rules, determining a plurality of faults based on the plurality rules and determine the length of time that the fault has been active, and generating a plurality of diagnostics based on the one or more faults. generating a diagnostic list comprising the plurality diagnostics ordered based on the determined length of time that each of the faults associated with the diagnostic has been active.

In some embodiments, the method further includes generating a diagnostic list comprising the plurality diagnostics ordered based on the determined length of time that each of the faults associated with the diagnostic has been active.

In some embodiments, the method further includes generating a work order for one of the plurality of faults in response to determining that the fault has existed for at least a predefined amount of time or that the fault has occurred for at least a predefined number of times.

Another implementation of the present disclosure is a building management controller for monitoring equipment status, the building management controller comprising a processing circuit. The processing circuit is configured to generate one or more constants for a piece of building equipment based on thresholds and device specific templates, wherein the constants are equation based relationships between a value and a threshold. The processing circuit is further configured to generate one or more sub-rules based on the one or more constants, wherein the sub-rules are equation based relationships between the one or more constants. The processing circuit is further configured to generate a rule based on the one or more sub-rules, wherein the rule is an equation based relationship between the one or more sub-rules and indicates whether the piece of building equipment is experiencing a fault. The processing circuit is further configured to identify a fault for the building equipment based on the rule and measured values for the building equipment.

In some embodiments, the processing circuit of the building management controller is further configured to determine one or more diagnostics based on a fault by identifying the fault for the building equipment based on the rule and measured values for the building equipment, determining sub-rules and constants that the rule is based on that are responsible for indicating the fault, and generating a diagnostic based on the determined sub-rules and constants.

In some embodiments, the processing circuit of the building management controller is further configured to determine reasons for the fault occurring based on the determined sub-rules and constants and one or more fault reasons associated with the determined sub-rules and constants.

In some embodiments, the processing circuit of the building management controller is further configured to generate a plurality of rules based on the one or more sub-rules, determine a plurality of faults based on the plurality rules and determine the length of time that the fault has been active, and generate a plurality of diagnostics based on the one or more faults.

In some embodiments, the processing circuit of the building management controller is further configured to generate a diagnostic list comprising the plurality diagnostics ordered based on the determined length of time that each of the faults associated with the diagnostic has been active.

In some embodiments, the processing circuit of the building management controller is further configured to generate a work order for one of the plurality of faults in response to determining that the fault has existed for at least a predefined amount of time or that the fault has occurred for at least a predefined number of times.

BRIEF DESCRIPTION OF THE DRAWINGS

FIG. 8 is an illustration of an interface displaying a rule based on sub-rules, according to an exemplary embodiment.

FIG. 9 is an illustration of an interface displaying another rule based on sub-rules, according to an exemplary embodiment.

DETAILED DESCRIPTION

Figure 1:
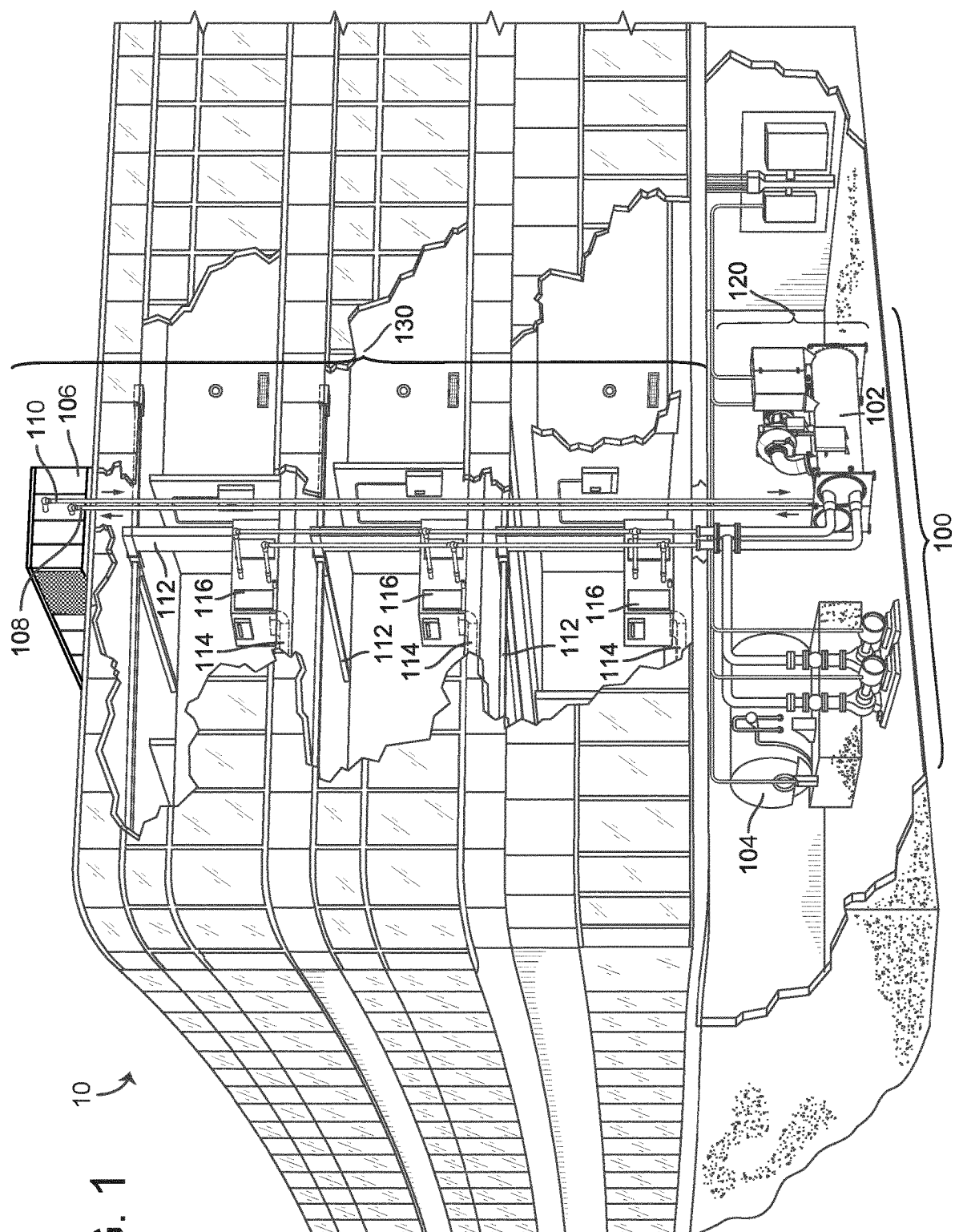
FIG. 1 is a drawing of a building equipped with a HVAC system, according to an exemplary embodiment.

Dynamic Rules with Sub-Rule Re-Use and Equation Driven Smart Diagnostics

Referring generally to the FIGURES, systems and methods for dynamic rules with sub-rule re-use and equation driven smart diagnostics are shown, according to various exemplary embodiments. A building, e.g., building 10 of FIG. 1, has various pieces of HVAC equipment, each piece of HVAC equipment having its own characteristics. Manufacturer specifications may define the various characteristics of the HVAC equipment. Based on these characteristics, a building controller can be configured to generate sub-rules and/or rules. Rules and/or sub-rules may provide for a comparison between the current operation of the equipment and how the equipment should be operating. This can allow for equipment fault detection.

The characteristics can be formed into a template for each type of device of a building. The building controller can be configured to generate constants which incorporate the device specific templates and various thresholds for the templates. The thresholds may be defined by the building controller and/or manually by a user and may be based on design conditions and/or site specific conditions. The building controller can be configured to use the constants in generating rules, sub-rules, and/or performing diagnostics. Any changes to a constant would automatically be realized in changes in the rules, sub-rules, or equation driven diagnostics that use the constants. Similarly, any changes to a sub-rule would automatically cause a change in any rules and/or equation driven diagnostics that utilize the sub-rule.

The sub-rules generated by the building controller can be an amalgamation of arithmetic/logical operands and constants. The sub-rules, when triggered, may indicate that a piece of building equipment is experiencing a fault or may indicate a particular operating condition of the piece of equipment. The sub-rules may indicate various statuses of a piece of equipment, for example, a sub-rule could be whether an AHU (e.g., AHU 116) is operational. The building controller can use the sub-rules to trigger equipment faults. The building controller can be configured to use the sub-rules to generate higher-level rules or to be used in equation driven diagnostics (e.g., diagnostic rules). Both the diagnostics functions that the building controller can be configured to perform and the rules may be equation driven and thus can incorporate the sub-rules. By modularly combining the sub-rules into rules and/or equation driven diagnostics, any change that is necessary for a rule and/or equation driven diagnostic can be realized by changing the sub-rules.

By changing a single sub-rule, a change across numerous rules and/or equation driven diagnostics that utilize the sub-rule can be realized by the building controller. By modularly combing sub-rules into rules and/or equation driven diagnostics, the amount of manual work required in setting up rules or equation driven diagnostics can be reduced. For example, if the rules and diagnostics did not modularly incorporate sub-rules, if a user wanted to universally change a single low level rule for multiple rules and diagnostics, the user would manually have to change every single rule and/or equation based diagnostic.

Diagnostics that can be generated via the building controller can be generated based on the sub-rules and/or rules e.g., diagnostic equations that can use the sub-rules and/or rules to generate the diagnostics. The diagnostic equations may be equation based, thus allowing for equation driven diagnostic generation. The building controller can be configured to generate a diagnostic list. Since the diagnostic equations are equation driven, the diagnostic list may be a list of diagnostics in order of duration. This may allow a technician to view how long the condition associated with the diagnostic has existed. This may allow a technician to view multiple diagnostics and determine from among the diagnostics, which diagnostic identifies what is causing the fault for the equipment. By having a dynamic list, a user may not need to sort through a static list to manually identify what has occurred that has caused a fault and thus to determine the proper diagnostic requires more manual user work. An example of lists of diagnostics is in FIG. 10.

An example of constants, sub-rules, and rules, for an AHU (e.g., AHU 116) of a building (e.g., building 10) is as follows in an example. A constant for the AHU may be that supply air fan output being greater than a particular amount indicates that the AHU is operating (e.g., it is on and functioning). The constant may be based on a device specific template for AHUs that indicates that the output of the supply air fan should be greater than a threshold amount. The particular threshold amount and the device specific template can be combined to generate the constant for the AHU. In this example, the threshold amount may be zero. The constant can be realized as, "Supply Air Fan Output >0."

A sub-rule for the AHU may incorporate the constant and/or multiple constants or equipment points. For example, a sub-rule may indicate whether the AHU is operating or not. The sub-rule may include two separate constants, the constants may be "Supply Air Fan Status >0" and the previously discussed constant, "Supply Air Fan Output >0." The sub-rule may indicate that if either of the constants is true, the AHU is operating. The sub-rule as a whole may be realized as, "(Supply Air Fan Status >0) OR (Supply Air Fan Output >0)." The sub-rule may be seen below in the high level rule as "AHU Operational."

Sub-rules for the AHU may further be based on equipment points. An equipment point may be an attribute, a variable, or a parameter associated with a piece of building equipment. An equipment point may be a measurement taken by a sensor, such as a temperature point or flow rate of the supply airflow. Additionally, an equipment point may be an attribute used to describe a piece of building equipment, such as a name. Equipment points may also be used to generate rules.

The high level rule may be based on the sub-rule and/or multiple sub-rules. The following high level rule may determine if the supply air pressure is above a setpoint. The high level rule may include the sub-rule discussed above and another sub-rule which indicates whether supply air pressure is higher than a setpoint. In this regard, the sub-rules can be combined into the rule with a Boolean AND comparison. The high level rule may be "(AHU Operational >0) AND (Supply Air Pressure Higher Than Supply Air Pressure Setpoint Point >0)." This high level rule may only trigger if the AHU is operating and the measured pressure has exceeded a setpoint.

Dynamic Work-Order Generation with Adaptive Diagnostic Task Details

The building controller can be configured to perform dynamic work-order generation with adaptive diagnostic task details. The work order system of the building controller can be a mechanism by which faults of equipment of a building are fixed by automatically assigning work orders to technicians, the task details being specific to a current fault in the system. The building controller can leverage rules, sub-rules, and diagnostic methods of the building controller to populate a work order with possible and/or probable causes of equipment faults and indicate tasks that the assigned technician needs to complete to resolve the fault.

The building controller can be configured to generate the work order in response to receiving a command from a user i.e., a user may observe a fault and indicate the fault to the building controller to generate a work order. The work order may be "Fix AHU." The building controller can be configured to fill in tasks in the work order for fixing the AHU. When the technician opens the generated work order, the technician can view the details for the tasks. The details may be based on faults and associated diagnostics. The building controller can be configured to cause the work order to include where the fault of the work order has occurred (e.g., what building, what floor, what room) and further what tasks the technician needs to perform (e.g., what systems or values need to be tested or checked). The work order may indicate one or more faults. A user may click or otherwise interact with the faults to view the causes for the fault and task details which may indicate to a technician how to resolve the fault. This may give a technician an idea of what needs to be fixed and what equipment, parts, or tools that the technician needs to bring to a job site.

Since the work order generated by the building controller can pinpoint the cause of equipment faults and includes a diagnostic and a task description, the technician knows, via the work order, what equipment and/or parts the technician needs to bring to a job site before departing to the job site. This prevents multiple trips from a technician base and a particular job site. The work orders generated by the building controller may include general information. The general information may include location, time of fault, etc. The work order may further include run hours (e.g., how long the particular fault has existed). The building controller can be configured to automatically generate the work order after the fault is present for a predefined amount of time. Further, the work orders may include the current state of the building equipment, for example, may state that there is a problem with a particular piece of equipment.

The building controller can be configured to use rules, sub-rules, and/or equation driven diagnostics in generating the work orders. Based on the rules, sub-rules, equation driven diagnostics, and/or other information, the equipment at issue can be identified, the time the issued occurred can be identified, spaces and/or buildings served by the equipment experiencing the issue is identified, the location of the particular piece of equipment, and/or what tasks or diagnostics should be done and/or have already been performed. This may link a general fault to the underlying equipment.

The building controller can include auto thresholds that it uses in generating a work order. If an issue in a piece of equipment is active for a predefined amount of time, the building controller can be configured to generate the work order. The predefined amount of time could be three days, five days, seven days, and/or any amount of time. The work order could be generated if a particular rule is triggered a particular amount of times and/or for particular durations of time. This may take into account both persistence of a fault (e.g., the length of time the fault has been active), and the number of occurrences of the fault. For example, the building controller can be configured to generate a work order if a rule indicates a fault for a first number of times during a predefined amount of time. Another example is that the building controller generates the work order if the issue has occurred for a particular amount of time over the course of another amount of time (e.g., the fault has been active three days out of a week).

The building controller can be configured to automatically assign the work order to a particular technician team based on the nature of the work order. For example, a particular team may specialize in fixing AHUs while another team may specializing in fixing device networks in a building. Work orders for AHUs may be assigned to the AHU team while work orders associated with building networks may be assigned to the building network team. The building controller can be configured to generate the work orders to include lists of actions to perform in resolving faults. For example, the work order may indicate which pieces of equipment in a system are likely responsible for the fault. This may allow a user to diagnose a system piece by piece in order of pertinence.

Building Automation System and HVAC System

Referring now to FIGS. 1-4, an exemplary building automation system (BAS) and HVAC system in which the systems and methods of the present invention can be implemented are shown, according to an exemplary embodiment. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alarming system, any other system that is capable of managing building functions or devices, or any combination thereof.

The BAS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
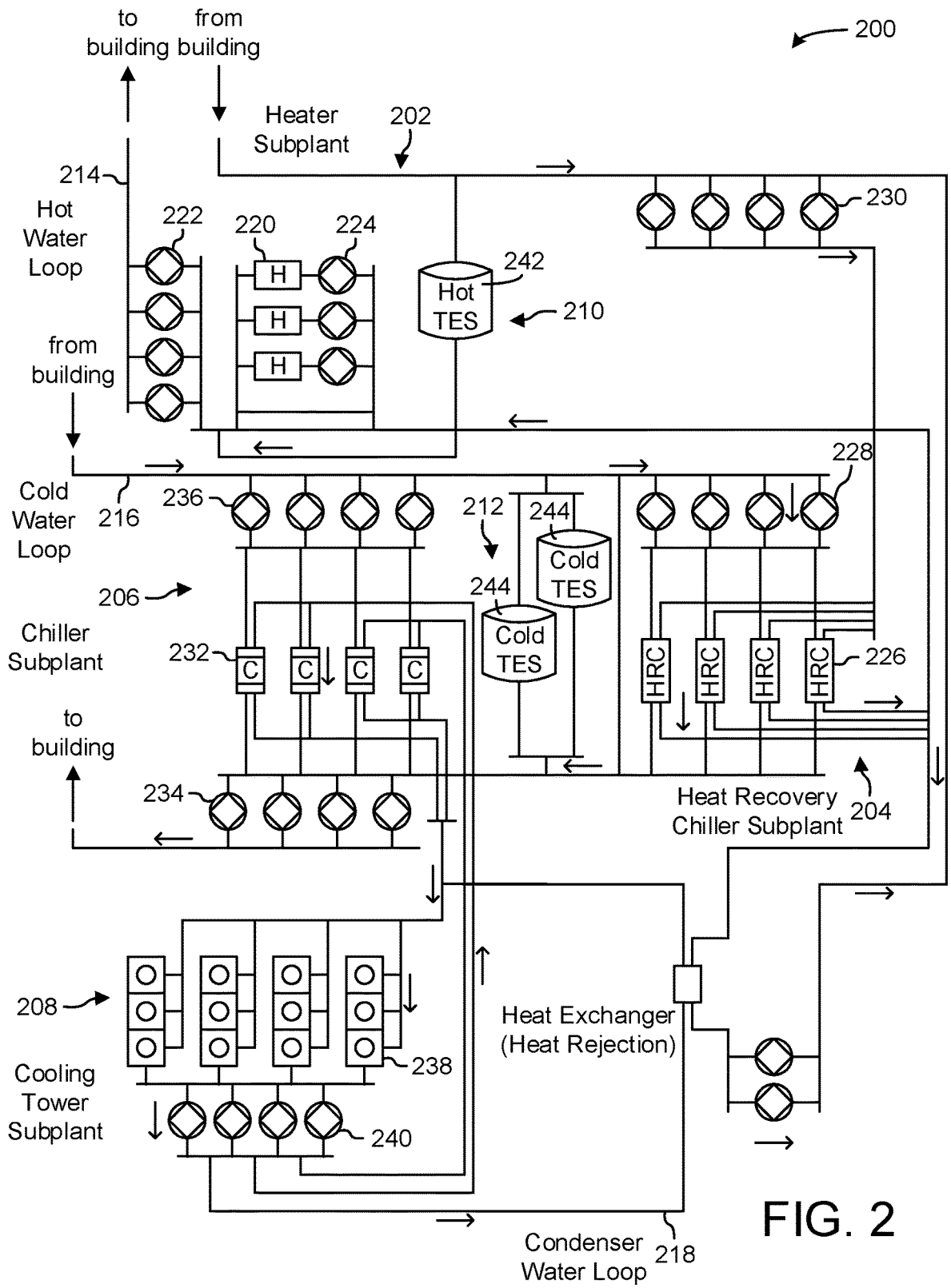
FIG. 2 is a block diagram of a waterside system that may be used in conjunction with the building of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
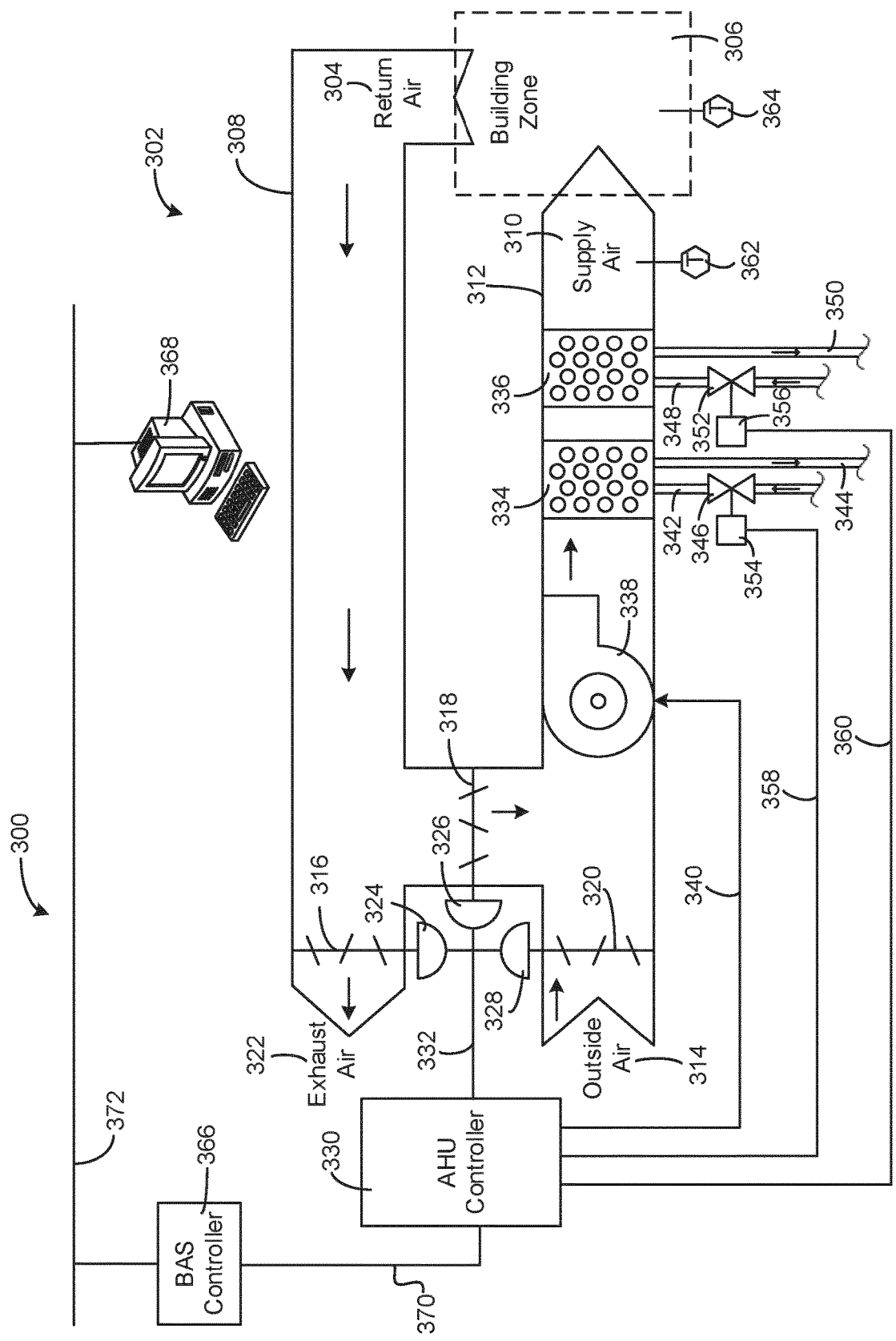
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Figure 4:
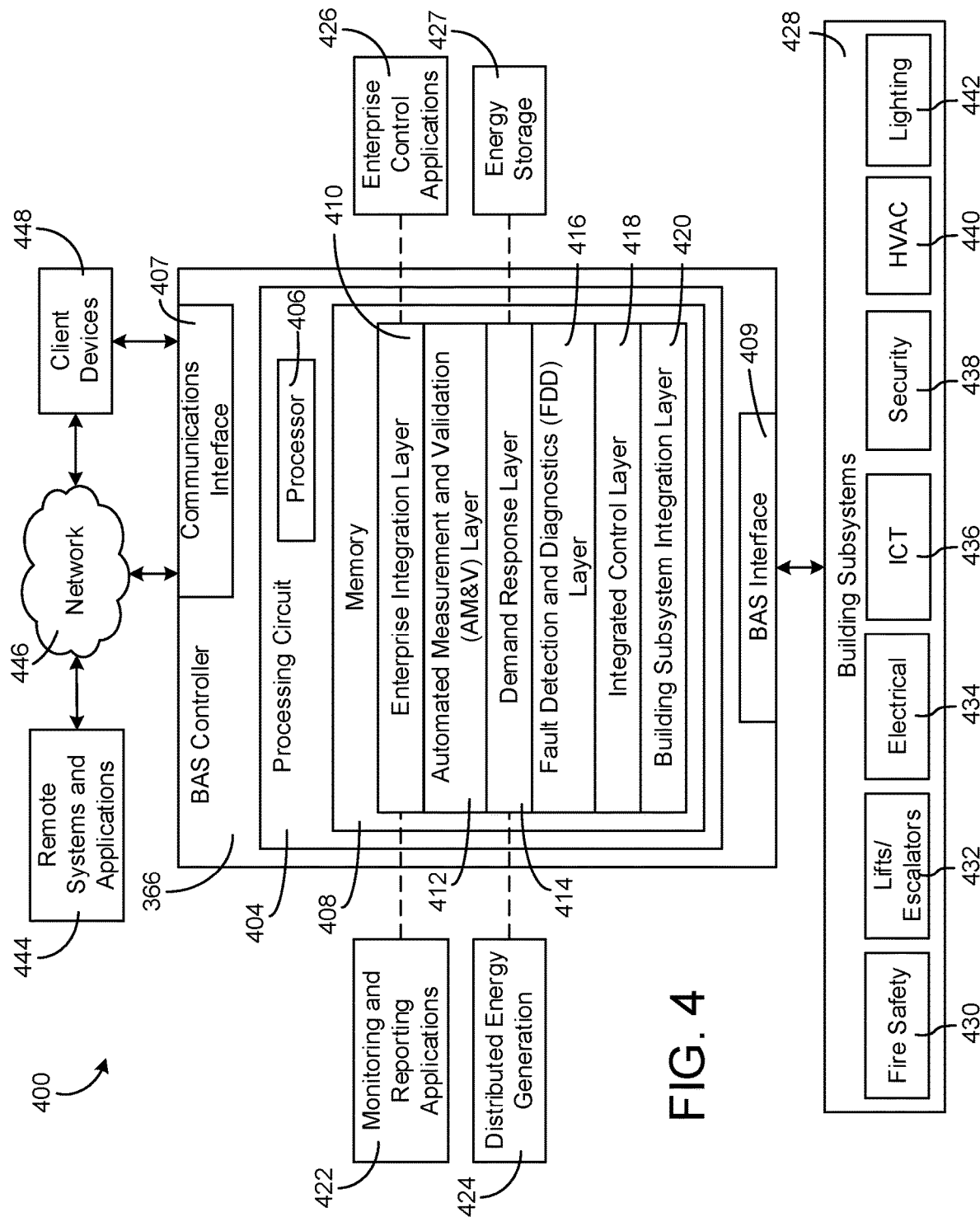
FIG. 4 is a block diagram of a building automation system (BAS) that may be used to monitor and/or control the building of FIG. 1, according to an exemplary embodiment.

Referring now to FIG. 4, a block diagram of a building automation system (BAS) 400 is shown, according to an exemplary embodiment. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/ escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alarm a user to repair the fault before it becomes more severe.

Systems and Methods for Dynamic Rules and Work-Order Generation

Figure 5:
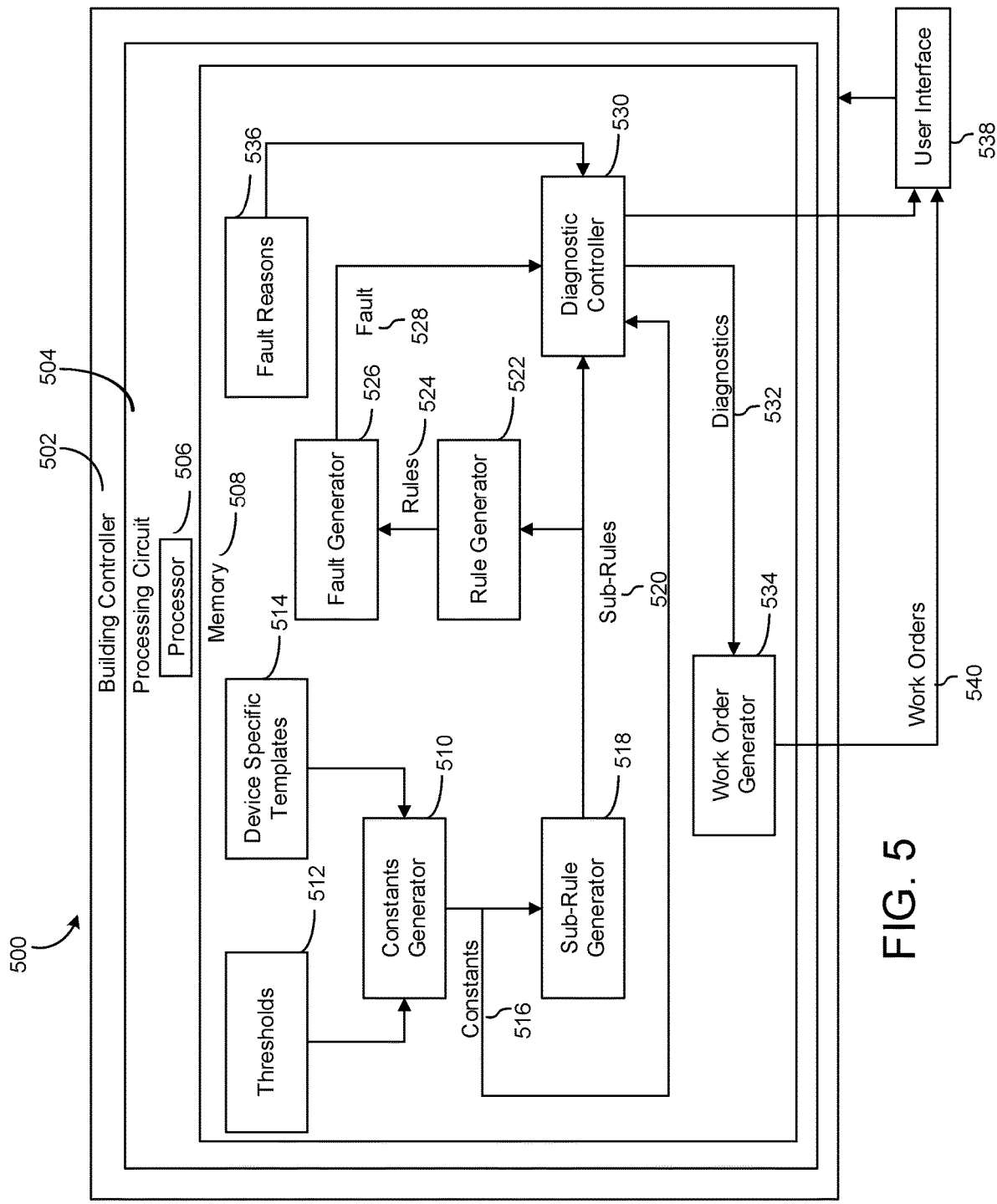
FIG. 5 is a diagram of a building controller with dynamic rules, equation driven smart diagnostics, and dynamic work-order generation, according to an exemplary embodiment.

Referring now to FIG. 5, a block diagram of a building controller 500 is shown, according to an exemplary embodiment. The building controller 502 shown in FIG. 5 may be the BAS controller 366 as described with reference to FIG. 4. In this regard, BAS controller 366 may include some and/or all of the functionality of the building controller 502. Likewise, the building controller 502 shown in FIG. 5 may include some and/or all of the functionality of the BAS controller 366 shown in FIG. 4.

The processing circuit 504 of the building controller of FIG. 5 may be the same and/or similar to the processing circuit 404 as described with reference to FIG. 4. Further, the memory 508 of the building controller 502 may be the same and/or similar to the memory 410 as described with reference to FIG. 4. Further the processor 506 shown in the building controller 502 may be the same and/or similar to the processor 406 as described with reference to FIG. 4.

The building controller 502 can be configured to perform the dynamic rule functions and the work order generation functions described herein. The memory 508 is shown to include a constants generator 510. The constants generator 510 can be configured to receive thresholds 512 and device specific templates 514 that the building controller 502 can store or receive (e.g., receive from an equipment specification database or from a user via a user interface). Based on the thresholds 512 and the device specific templates 514, the constants generator 510 can be configured to generate constants 516. The device specific templates 514 may be particular low level rules for various devices. For example, templates for a particular device may include various low level rules such as "Air temperature should be above A" or "Differential pressure should not exceed B."

The thresholds 512 used by the constants generator 510 may be particular values for "A" or "B" of the templates. Both the thresholds 512 and the device specific templates 514 can be input by a user e.g., input via the user interface 538 shown in FIG. 5 and/or may be and/or may be based on equipment specifications. The thresholds 512 may be design specific, i.e., specific to the design of the piece of equipment or may be site specific, specific to the particular use of the equipment in a building. The constants 516 that constants generator 510 generates can be provided to a sub-rule generator 518 and a diagnostic controller 530, both shown in FIG. 5.

The sub-rule generator 518 can be configured to generate sub-rules 520 based on the constants 516 it receives. The sub-rule generator 518 may include one or more constants and one or more Boolean comparisons. For example, a sub-rule may be that a particular condition is true if either a first constant or a second constant is true. For example, a sub-rule which is "AHU Operating" may be operational if Constant A OR Constant B is true. Another sub-rule could be "AHU Operating" may be operational if Constant A AND Constant B is true. Another sub-rule could be "AHU Operating" may be true if Constant A XOR Constant B is true. The Boolean comparison may be any type of Boolean operation (e.g., AND, OR, NAND, NOR, XOR, NOT, etc.).

The sub-rules 520 generated by the sub-rule generator 518 may be provided to a rule generator 522 and a diagnostics controller 530. The rule generator 522 can be configured to generate rules 524 i.e., high level rules based on one or more sub-rules 520. For example, a rule could be "AHU air pressure is above a setpoint" if two sub-rules are true, the first rule being that the AHU is operational and that a measured air pressure is above the setpoint. In this regard, the rule could be: rule is true if sub-rule A is true AND sub-rule B is true. Any Boolean operator or comparison or hierarchy of comparisons can be used between the sub-rules 520.

The fault generator 526 can be configured to receive the rules 524 from the rule generator 522 and determine faults 528 based on the rules 524 and monitored values of pieces of building equipment. The fault generator 526 can be configured to receive information pertaining to the status of the building equipment and apply the status information to the rules 524. If a rule is true, the piece of building equipment may be experiencing a fault 528 or otherwise is operating abnormally. In this regard, the fault generator 526 can generate a fault 528 if a particular piece of equipment or system within a building is experiencing a fault. Fault generator 526 can be configured to provide the indication of the fault 528 to the diagnostic controller 530. As an example, there may be a rule that indicates that a room is not getting enough cooling. The rule may indicate that an AHU is not supplying enough air. The rule may use sub-rules 520 such as is the AHU operational, whether the cooling mode on, and whether the airflow in a proper range. If all three sub-rules of the rule are true, fault generator 526 may identify that there is a fault 528. In some embodiments, fault generator 526 determines that there is a fault 528 if the sub-rules 520 have each been true for a predefined amount of time.

The diagnostic controller 530 can be configured to generate diagnostics 532 based on rules 524, constants 516, and/or faults 528 it receives. If the diagnostic controller receives a fault 528 for a piece of equipment for a particular constant 516 and/or rule 524, the diagnostic controller 530 can be configured to monitor how long the fault 528 has been persisting. The diagnostic controller 530 can be configured to generate diagnostics 532 based on the rules 524, constants 516, and/or faults 528 which indicate that a particular fault 528 has occurred in the system for a particular amount of time. The diagnostic controller 530 can be configured to generate a diagnostic list 1000 which indicates diagnostics 532 and the amount of time that the diagnostic has been active. The diagnostic list 1000 may be organized in order of the longest active fault associated with the diagnostic. This can be seen in FIG. 10. The diagnostic controller 530 can be configured to provide the diagnostics 532 and/or the diagnostic list 1000 to the user interface 538 shown in FIG. 5 and to the work order generator 534.

The diagnostic controller 530 can be configured to receive fault reasons. The fault reasons may be a list of potential reasons for a particular fault occurring. In this regard, the diagnostics 532 that the diagnostic controller 530 generates may include an indication of the reasons that could have led to a particular fault. Therefore, a user can view the fault reasons for a particular diagnostic in order to resolve the fault. The diagnostic list 1000 may include one or more diagnostics 532 that a user can interact with to view the various fault reasons.

The diagnostic controller 530 may include a plurality of diagnostic rules or equations. The diagnostic controller 530 can be configured to use the diagnostic equations, faults 528 determined by fault generator 526, sub-rules 520 generated by sub-rule generator 518, and/or constants 516 generated by constants generator 510 to generate the diagnostics 532. The various diagnostics equations may be based on various sub-rules 520 and/or constants 516 that it receives from the constants generator 510 and/or the sub-rule generator 518. The diagnostics equations may indicate particular reasons for a fault and/or potential solutions to the fault. Various reason for the fault may be stored in the memory 508 and/or retrieved by the diagnostic controller 530 i.e., from the fault reasons block of the memory 508.

As an example, a diagnostic equation or equations may indicate a reason why the cooled water provided by a cooling tower is not cold enough. The cooling tower may not be giving full output even though it is operating at 100%. The diagnostic equations may be based on three sub-rules 520, is the cooling tower operational, is the airflow of the cooling tower correct, and is a variable frequency drive (VFD) operating properly. The diagnostic equations may use the three sub-rules 520 to identify the possible cause of the cooled water not being cold enough. The diagnostic equations may specifically use equipment values that it receives during a time when the fault was active to identify the cause of the fault. The diagnostic equation may look at the lengths of time that the sub-rules were true to determine the a diagnosis for the fault.

As another example, if a rule 524 indicates that there is a fault 528 with a with a chiller, a diagnostic equation or equations may indicate what the cause of the fault 528 is. The diagnostic equation may look at how long a cooling coil of the chiller has been closed and whether there is an indication of a chiller supply output being too high (these indications may be based on sub-rules or constants). If a cooling coil valve was closed for a predefined amount of time and the chiller supply was too high for a predefined amount of time, the diagnostic rule may indicate that the cooling coil valve is responsible for the chiller not properly functioning and for air in a room not being cold enough. In some embodiments, the diagnostic equation can be configured to generate a list of faults in order of length of time that the faults were active. For example, if the diagnostic equation indicates that the cooling coil was closed for 20 hours and that the chiller supply was too high for 1 hour, the diagnostic may list "cooling coil closed" above "chiller supply to high" to give a technician an idea of what may be the root cause of a fault and what they should analyze first.

The work order generator 534 can be configured to generate work orders 540 based on the diagnostics 532 and/or directly or indirectly based on the constants 516, sub-rules 520, and/or rules 524. In this regard, the work order generator 534 can be configured to generate a work order 540 and provide the work order 540 to a user via the user interface 538. The work order 540 may include a particular fault 528 and the various reasons that may have caused the fault 528 i.e., the work order 540 may be based on the diagnostics 532 generated by the diagnostic controller 530. Further, the work order 540 may include various steps for resolving the problem e.g., the work order 540 may be based on the fault reasons included in the diagnostics 532. The task description which the work order generator 534 includes in the work order it generates may be based on the most probable diagnostic generated by diagnostic controller 530 e.g., the diagnostic 532 associated with a fault 528 that has been active for the longest amount of time.

The work order generator 534 can be configured to assign the work order 540 to a particular technician and/or technician group. For example, based on the fault 528 that the work order 540 is generated for, the work order generator 534 can be configured to assign the work order 540 to a technician group that specializes in fixing that particular fault. Further, the work order generator 534 can be configured to assign work orders 540 based on number of work orders 540 per technician or technician group i.e., the work order generator 534, can be configured to load balance the work loads of various technicians.

The work order generator 534 can be configured to automatically open and/or close work orders 540. For example, if the work order generator 534 determines that a work order 540 should be opened based on a fault or faults 528 occurring, the work order generator 534 can be configured to generate a work order 540. Further in response to the work order generator 534 determining that the fault 528 has been fixed, work order generator 534 can further be configured to close the work order 540. Also, a technician can indicate via the user interface 538 that the work order 540 is complete and in response the work order generator 534 can be configured to close the work order 540.

The work orders 540 generated by work order generator 534 may indicate equipment information to a technician. The work order 540 may indicate energy usage, performance trends, and/or any other information. Equipment may be malfunctioning when the energy usage becomes too high or too low. The work order 540 may identify the equipment that is experiencing the issue, the time that the issue was first detected, the associated spaces that the equipment serves, the location of the equipment, and what diagnostics may have already been attempted if the issue is a reoccurring issue.

The user interface 538 shown in FIG. 5 may be a smartphone, a tablet, a display screen, an input device, and may be part of the building controller 502 and/or in communication with the building controller 502. The user interface 538 can be configured to display diagnostic information and/or work order information to a user e.g., a technician. The user interface 538 may allow for a user to interact with various diagnostics 532 and/or work orders 540 (e.g., enter an indication of a completed work order 540, view the various steps to resolving equipment faults, etc.). The user interface 538 may be configured to display the interfaces shown in FIGS. 7-10 and FIGS. 12-13.

Figure 6:
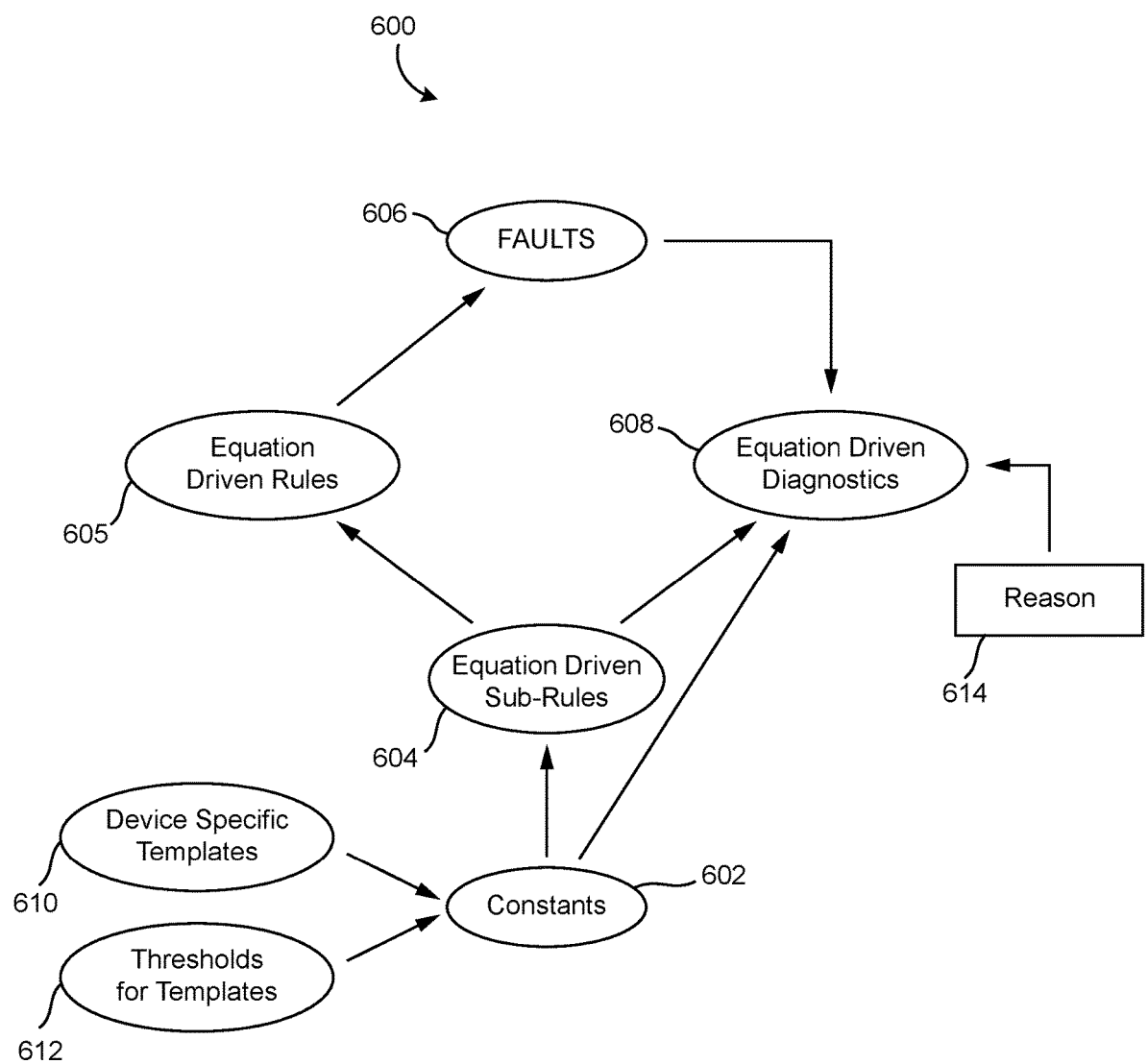
FIG. 6 is a flow chart of a process for generating rules with the building controller of FIG. 5 based on sub-rules and constants and using the rules to perform diagnostics, according to an exemplary embodiment.

Referring now to FIG. 6 a process 600 is shown for generating dynamic rules that incorporates and reuses sub-rules 520 and/or constants 516 and further performing smart diagnostics, according to an exemplary embodiment. The process of FIG. 6 can be performed by the building controller 502 of FIG. 5 and/or by the BAS controller 366. FIG. 6 further illustrates the hierarchy of constants 516, sub-rules 520, rules 524, and equation diagnostics 532, which may be the same or different as those shown in FIG. 5 As shown in FIG. 6, constants 516 are based on specific templates and thresholds. Sub-rules 520 are based on the constants 516 while rules 524 are based on the sub-rules 520. Further, the equation driven diagnostics 532 are based on the sub-rules 520 and the constants 516. Any changes in a template 610, a threshold 612, a constant 516 and/or a sub-rule 520 may propagate through the hierarchy. For example, if a threshold 612 is changed, any constants 516 using the threshold 612 will also change. Any sub-rules 520 using the constants 516 dependent on the changed threshold 612 will also change. Further, any rule or equation driven diagnostic 532 based on the changed sub-rule 520 will also automatically change. This can save time in adjusting and/or updating the constants 516, rules 524, sub-rules 520, and equation driven diagnostics 532.

In step 602, the constants generator 510 can generate one or more constants 516 based on device specific templates 610 and/or thresholds for the templates 612. The constants 516 that the constants generator 510 generates may be low level rules i.e., equation based relationships between templates 610 and thresholds 612. For example, a constant 516 could be that a pressure differential for a particular piece of HVAC equipment is within a particular range (e.g., defined by the threshold). The thresholds 612 used in the constants 516 may be based on design conditions (e.g., the actual design of the piece of HVAC equipment) and/or may be based on site specific information (e.g., the configuration of the HVAC equipment in a particular building).

In step 604, the sub-rule generator 518 can be configured to generate sub-rules 520 based on the one or more constants. For example, a sub-rule 520 may be that a particular outcome is true if one or both of the constants are true. For example, a sub-rule 520 for an AHU may be that the AHU is operational is either a supply air fan status is greater than zero (e.g., a first constant) or that a supply air fan output is greater than zero (a second constant).

In step 605, the rule generator 522 can generate one or more rules 524 based on one or more sub-rules 520. The rules 524 may indicate that a particular fault 528 has or has not occurred in a particular piece of HVAC equipment. For example, a rule 524 may indicate that measured air pressure is higher than a setpoint for an AHU based on two sub-rules 520. The sub-rules 520 may be AHU operational and supply air pressure greater than a setpoint. The rule 524 may be based on a Boolean "and" comparison of the two sub rules 520 and/or any other Boolean comparison i.e., determining if both sub-rules 520 are true.

In step 606, the fault generator 526 can determine whether any faults 528 have occurred based on the rules 524 generated by the rule generator 522. If any of the rules 524 are true and/or have been true for a predefined number of times and/or for predefined lengths of time, fault generator 526 can determine that a fault 528 for a particular piece of building equipment has occurred. In some embodiments, a work order 540 is automatically generated for a piece of equipment after a piece equipment has run for a predefined amount of time since the equipment may require maintenance after the predefined amount of time.

In step 608, the diagnostic controller 530 can generate diagnostics 532 based on any determined faults 528, sub-rules 520, and/or constants 516. Further, the diagnostic controller 530 can include various reasons for a fault 528 in the diagnostics 532. If a particular fault 528 is determined, the diagnostic controller 530 can analyze what sub-rules 520 and/or constants 516 are responsible for the fault 528 being triggered. Based on various fault reasons 614 that the diagnostic controller 530 can receive and/or store, the diagnostic controller 530 can be configured to identify particular reasons for the fault 528 occurring. The diagnostic controller 530 may by equation driven and use various diagnostic equations that take into account the constants 516 and/or sub-rules 520 to identify the most likely reason for the fault 528 occurring.

As an example, an AHU and a VAV may supply air to a particular room. A fault 528 may be triggered that identifies that the room is not getting enough cooling. This may be triggered based on a rule 524 for the room. Based on the various constants 516 and sub-rules 520 that make up the rule 524, the diagnostic controller 530 can be configured to identify whether the AHU or the VAV is responsible for the fault 528 with the constants 516, sub-rules 520, and/or diagnostics 532. Further, the diagnostic controller 530 can be configured to determine what is particularly at fault with the identified source of the fault 528. For example, based on the constants 516 and/or sub-rules 520, if the diagnostic controller 530 determines that the VAV is responsible for the fault, the diagnostic controller 530 can further determine that the valve of the VAV is stuck and/or not positioned correctly.

Figure 7:
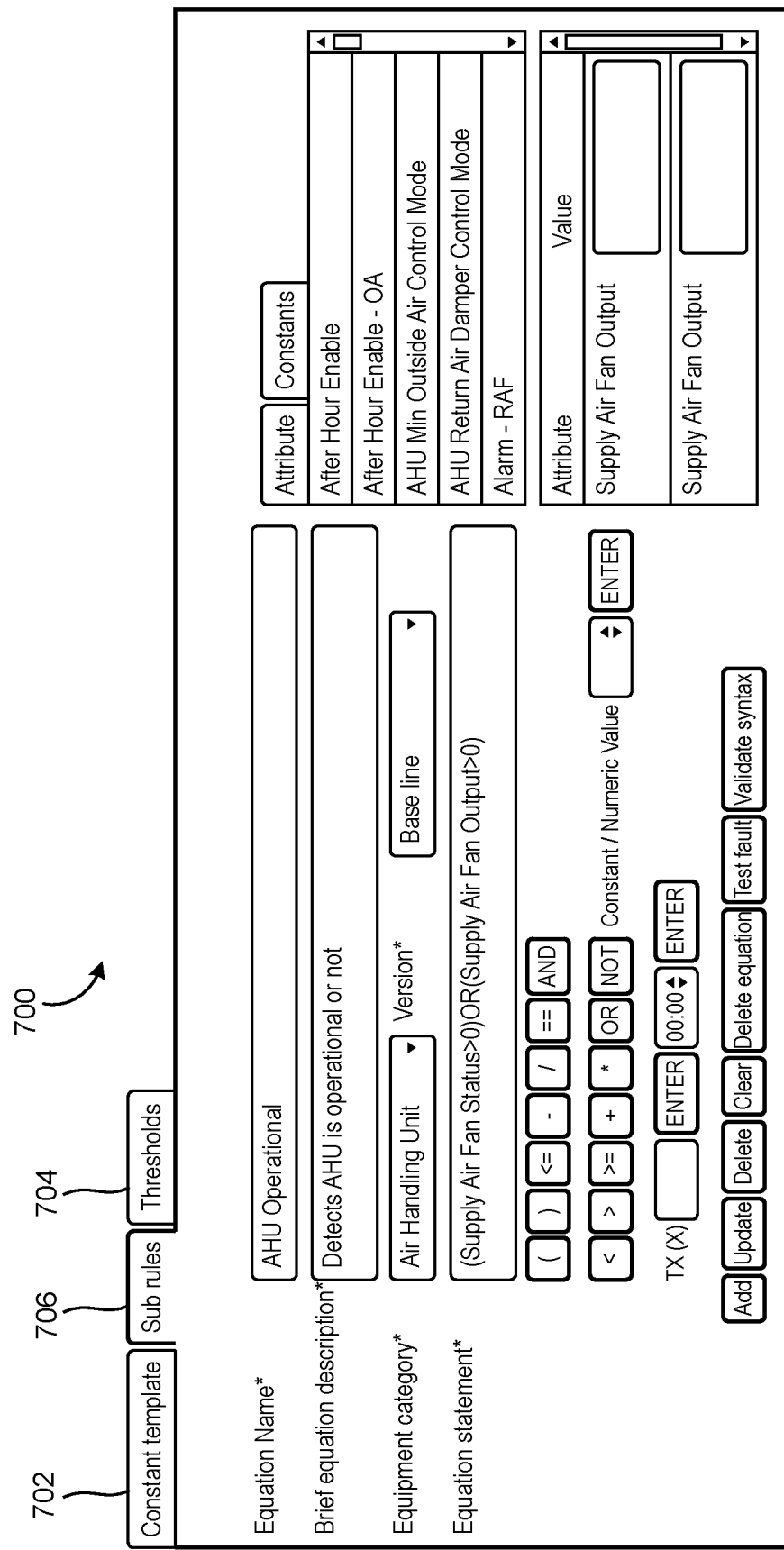
FIG. 7 is an illustration of an interface displaying a sub-rule, according to an exemplary embodiment.

Referring now to FIG. 7, a display 700 illustrating a particular sub-rule 520 that can be displayed via the user interface 538 of FIG. 5 is shown, according to an exemplary embodiment. The display 700 of FIG. 7 can allow for a user to define a sub-rule 520. In FIG. 7, the sub-rule 520 is defined as an OR condition of two separate constants 516. However, any number of constants 516 can be used in the definition of the sub-rule 520. A constant template tab 702 is shown for the definition of device specific templates 610 while a thresholds tab 704 is shown for the definition of thresholds 612. In FIG. 7, a sub-rules tab 706 is shown and provides information related to the sub-rule 520. The name of the sub-rule 520 is "AHU Operational." The description of the sub-rule 520 is "Detects AHU is operational or not." The equation for the sub-rule 520 is defined as "(Supply Air Fan Status >0) OR (Supply Air Fan Output >0)." A user can define the sub-rule 520 "Detects AHU is operational or not" in any manner using any number of constants and/or any Boolean relationship between the constants and/or hierarchy of relationships. The sub-rule 520 shown in FIG. 7 can be reused in any number of rules 524 or equation driven diagnostics 532.

Referring now to FIG. 8, a display 800 that can be displayed via the user interface 538 that illustrates a rule 524 based on one or more sub-rules 520 is shown, according to an exemplary embodiment. The display 800 of FIG. 8 can allow for a user to define a rule 524 based on one or more sub-rules 520 and/or constants 516. In FIG. 8, the rule 524 indicates whether there is high building static pressure. The rule "detects high supply air static pressure by comparing with setpoint" as illustrated in FIG. 8. The rule may indicate that there is a fault if two sub-rules are true. The first sub-rule is whether an AHU is operational. It is included in the rule as "AHU Operational >0" (e.g., the sub-rule shown in FIG. 7). The second sub-rule is whether a supply air pressure is greater than a setpoint, this is included in the rule as "Supply Air Pressure Higher Than Supply Air Pressure Set Point >0." The equation for the rule is defined as "(AHU Operational >0) AND (Supply Air Pressure Higher Than Supply air Pressure Set Point >0)." The rule may use any Boolean comparison between sub-rules and may include any number of sub-rules. The rule can be defined in the equation statement box shown in FIG. 8.

Referring now to FIG. 9, another example of a rule 524 based on multiple sub-rules 520 is shown, according to an exemplary embodiment. The interface of FIG. 9 is similar to the interface of FIG. 8. The fault 528 that the rule 524 shown in FIG. 9 identifies is air quality. The rule 524 is shown to be based on "AHU Operational >0" as is the rule 524 of FIG. 8 (the sub-rule 520 of FIG. 7). Further, the rule 524 is based on a sub-rule 520 for air quality. Specifically, the sub-rule 520 is shown to be "Poor Indoor Air Quality >0." The rule 524 of FIG. 9 includes both sub-rules 520 and is true if both sub-rules 520 are true, specifically, the rules 524 are, "(AHU Operational >0) AND (Poor Indoor Air Quality >0)."

Referring now to both FIG. 8 and FIG. 9, two rules 524 are shown to be based on a common sub-rule 520. As can be seen, the rules 524 of FIG. 8 and FIG. 9 are based on the "AHU Operational" sub-rule 520. This modular construction of rules 524 allows for faster development of rules 524 and prevents from re-doing work. For example, if the sub-rule 520 of AHU operation needs to be adjusted in any way, the sub-rule 520 can be adjusted on its own without directly adjusting the rule 524 of FIG. 8 or the rule 524 of FIG. 9. Changing the definition of the sub-rule 520 "AHU Operational" will automatically propagate into the rules 524 of FIG. 8 and FIG. 9.

Figure 10:
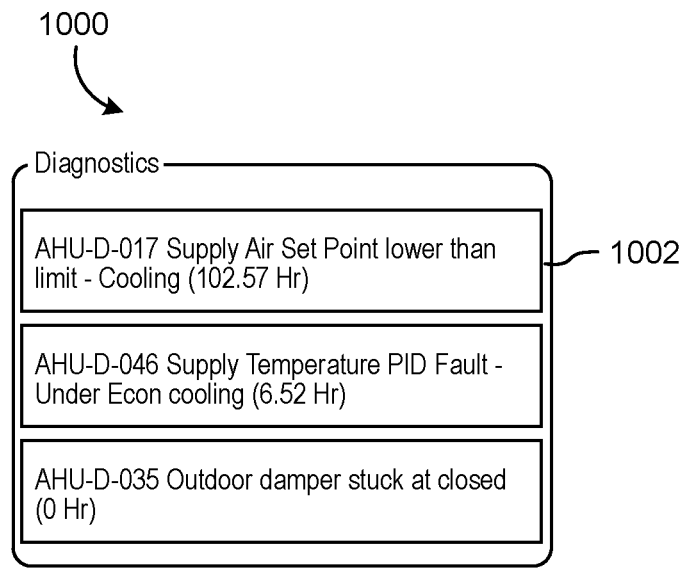
FIG. 10 is an illustration of a diagnostics list that can be generated by the building controller of FIG. 5, according to an exemplary embodiment.

Referring now to FIG. 10, a diagnostics list 1000 that can be generated by the diagnostics controller 530 of FIG. 5 and displayed via the user interface 538 of FIG. 5 is shown, according to an exemplary embodiment. Each block of the diagnostics list 1000 may be a particular fault 528 or equipment status indicated by a particular rule 524 and/or sub-rule 520 e.g., each of the three diagnostics 532 shown in FIG. 10 may be triggered based on the triggering of an associated rule 524 e.g., the rule 524 generated by the rule generator 522. If a user clicks or interacts with one of the diagnostics 532 shown in FIG. 10, the reason that the fault 528 has occurred may be displayed, this can help the user know what is causing the fault 528 and what steps to take in resolving the fault 528. Each diagnostic block shown in FIG. 10 can be generated by diagnostic controller based on a diagnostic rule.

The diagnostic controller 530 is shown to order the diagnostics 532 in order time that the diagnostic 532 has been active i.e., the time that the rule 524 has been triggered. As can be seen in FIG. 10, a particular AHU i.e., AHU-D has three different diagnostics 532. The top diagnostic 1002 indicates that a supply air setpoint has been lower than an air limit for 102.57 hours. Since this fault 528 has been active for the longest amount of time, it is at the top of the list to signify to a technician that this may be the most relevant fault of AHU-D. A technician can click on each of the diagnostic 532 in the diagnostic list 1000 to view information indicating why the fault 528 may have occurred. If the building controller 502 generates a work order 540 for AHU-D, the work order 540 may include the top diagnostic 1002 shown in FIG. 10 as a task for a technician.

Figure 11:
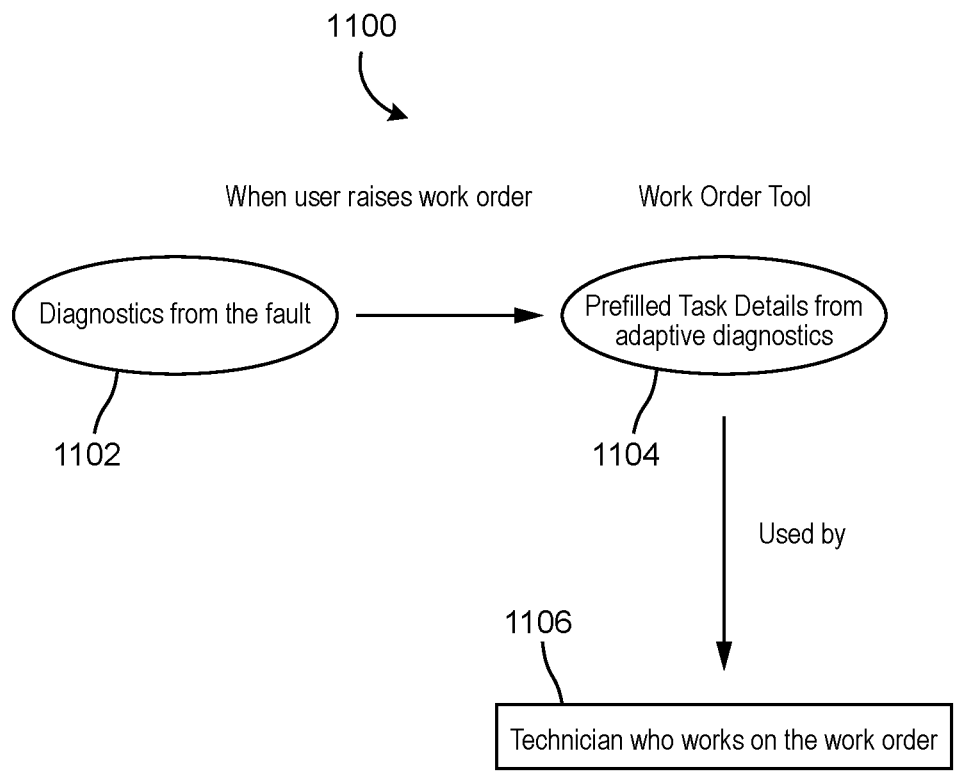
FIG. 11 is a flow chart of a process for generating a work order with the building controller of FIG. 5, according to an exemplary embodiment.

Referring now to FIG. 11, a process 1100 is shown for generating a work order 540 by the building controller 502 of FIG. 5, according to an exemplary embodiment. In step 1102, one or more diagnostics can be generated. The diagnostics can be generated via the systems and methods illustrated in FIG. 5 and FIG. 6 e.g., the process 600 shown in FIG. 6 and diagnostic controller 530 of the building controller 502 of FIG. 5. The diagnostics 532 may indicate that a particular piece of building equipment is experiencing a fault 528 and particular steps for trouble shooting and fixing the fault 528. In some embodiments, a user puts in a request for a work order 540 for a particular piece of equipment or particular zone of a building.

In response to receiving the work order request and/or based on the diagnostics, in step 1104, the diagnostic controller 530 can generate a work order 540. The work order 540 may indicate task details that can be populated based on information (e.g., "Fix cooling coil valve" or step by step direction to fix fault by analyzing pieces of equipment piece by piece) included in the diagnostics 532 generated in step 1102. In some embodiments, the work order 540 includes the diagnostic or task information related to the diagnostic 532 that has been active for the longest amount of time, i.e., a fault 528 causing the diagnostic 532 has been active longer than other faults related to other diagnostics 532. The work order 540 may be generated in step 1104 if the fault 528 causing the diagnostic 532 has been active for a predefined amount of time, has occurred a predetermined number of times, has be active for a predefined amount of time within a longer predefined amount of time, or has occurred a predefined amount of time within a predefined amount of time. In step 1106, the generated work order 540 may be sent to a technician and/or technician group. The work order generator 534 can assign the work order 540 based on a location of the technician or technician group and the piece of equipment experiencing a fault 528, based on the specialties of the technician or technician group, and/or based on the work load of the technician or technician group.

Figure 12:
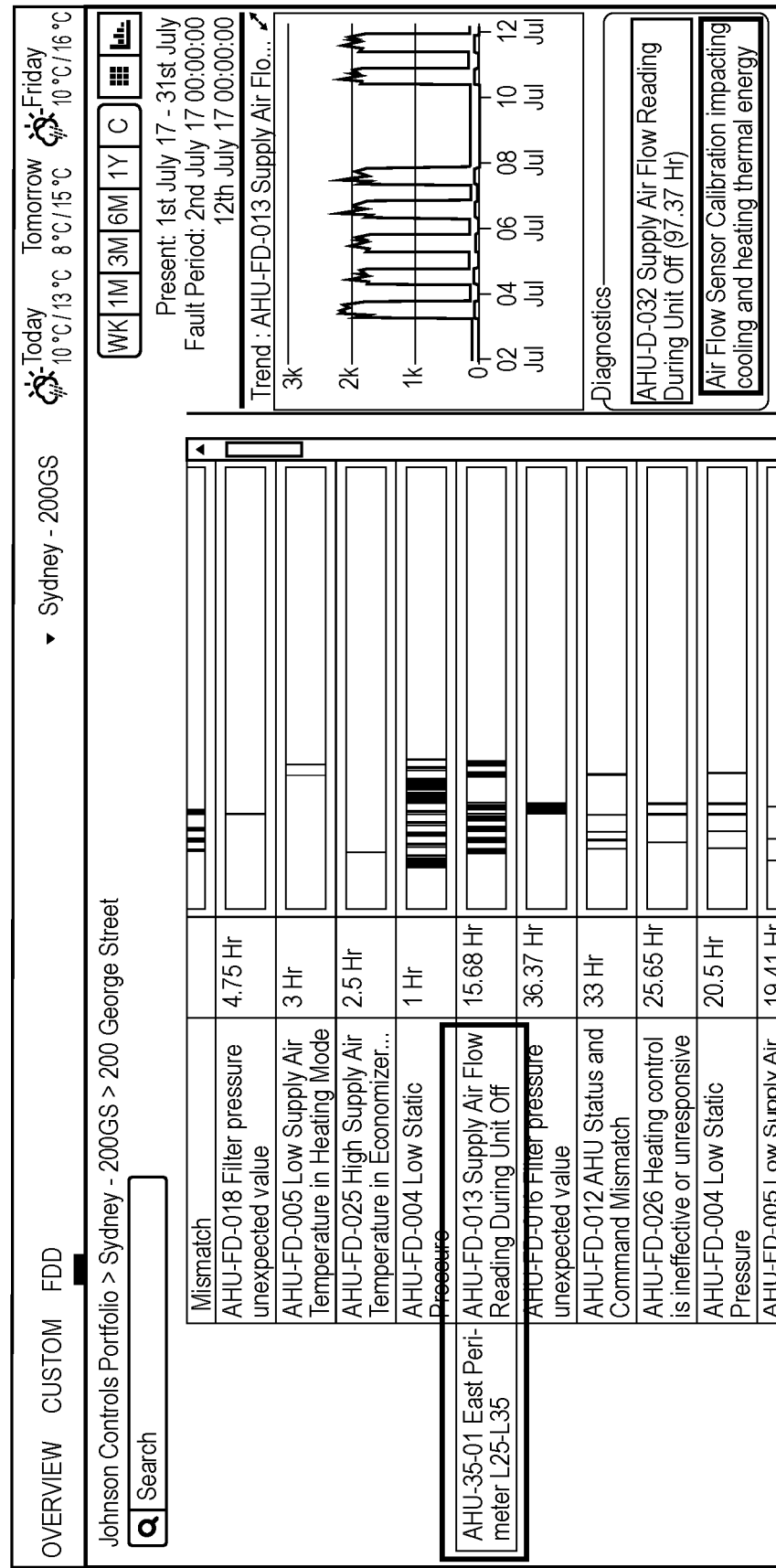
FIG. 12 is an illustration of an interface displaying diagnostics with fault reasons that can be generated by the building controller of FIG. 5, according to an exemplary embodiment.

Referring now to FIG. 12, an interface 1200 that the diagnostic controller 530 can generate is shown, according to an exemplary embodiment. In FIG. 12, multiple sub-rules 520 and/or rules 524 are shown and the times that the sub-rules 520 and/or rules 524 were triggered is shown. The various sub-rules 520 and/or rules 524 shown in the interface of FIG. 12 indicate a total amount of time that a particular sub-rule 520 and/or rule 524 has been tripped. This may allow for a technician to view which sub-rules 520 and/or rules 524 may be most relevant to resolving a particular fault 528. FIG. 12 is further shown to indicate a trend of values for a selected sub-rule 520 and/or rule 524. In FIG. 12, the trend indicates values over time that are associated with the selected sub-rule 520 and/or rule 524. The values include supply air fan status, supply air fan output, and supply air flow for a particular AHU. The interface 1200 further shows a diagnostic which indicates that there is a calibration problem with an airflow sensor of the AHU (e.g., the reason for the fault).

Figure 13:
FIG. 13 is an illustration of an interface displaying work orders with diagnostic reasons that can be generated by the building controller of FIG. 5, according to an exemplary embodiment.

Referring now to FIG. 13, an interface 1300 including a work order 540 is shown, according to an exemplary embodiment. The work order 540 shown in FIG. 13 can be a work order 540 manually opened by a user or a work order automatically generated by the building controller 502. In some embodiments, the work order 540 is automatically generated by the building controller 502 and sent to a user for final approval of opening the work order 540. The work order 540 indicates the location of the building including the equipment experiencing the fault and further identifies the particular piece of equipment. The work order 504 further includes task details and reasons for the fault 528 occurring. In FIG. 13, the task details indicate that there is a calibration problem with an airflow sensor of the AHU. The interface 1300 shown in FIG. 13 is further shown to include other work orders for the same building. These work orders 540 indicate whether the work order 540 is open or closed and may further indicate the date that the work order was 540 opened. Various documents can be attached by a user or can be manually attached to the work order 540 by the work order generator 534 of the building controller 502. For example, the work order generator 534 may automatically attach an equipment specification for a particular AHU is the work order 540 is for fixing that particular type of AHU. Further, if a particular part is at fault in the AHU, the work order 540 may include the specification of that particular piece of equipment.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system for monitoring equipment status, the building management system comprising a processing circuit configured to:
   generate one or more constants for a piece of building equipment based on thresholds and device specific templates, the constants comprising equation based relationships between values and thresholds;
   generate one or more sub-rules based on the one or more constants and one or more equipment points, the sub-rules comprising equation based relationships between the one or more constants and the one or more equipment points;
   generate a rule based on the one or more sub-rules and the one or more equipment points, the rule comprising an equation based relationship between the one or more sub-rules and the one or more equipment points and indicates whether the piece of building equipment is experiencing a fault;
   receive one or more values associated with the one or more equipment points;
   determine a constant of the one or more constants is satisfied responsive to determining the one or more values satisfy a threshold of the constant;
   determine a sub-rule of the one or more sub-rules is satisfied responsive to determining the constant is satisfied;
   determine the rule is satisfied responsive to determining the sub-rule is satisfied; and
   identify a fault in the piece of building equipment responsive to determining the rule is satisfied.

2. The building management system of claim 1, wherein the processing circuit is further configured to determine one or more diagnostics based on the identified fault by:
   identifying a diagnostic that corresponds to the sub-rule of the one or more sub-rules; and
   generating the diagnostic responsive to satisfaction of the sub-rule causing the rule to be satisfied and the fault to be identified.

3. The building management system of claim 2, wherein the processing circuit is configured to determine reasons for the fault occurring based on the sub-rule causing the rule to be satisfied and one or more fault reasons associated with the sub-rule.

4. The building management system of claim 1, wherein the processing circuit is further configured to:
   generate a plurality of rules based on the one or more sub-rules;
   determine each of the plurality of rules is satisfied responsive to the determination that the sub-rule is satisfied;
   determine a plurality of faults responsive to determining each of the plurality of rules is satisfied; and
   generate a plurality of diagnostics based on the plurality of faults.

5. The building management system of claim 1, wherein the processing circuit is configured to determine the rule is satisfied by:
   determining at least one of the one or more sub-rules is satisfied responsive to determining at least one of the one or more constants is satisfied; and
   determining the rule is satisfied responsive to determining each of the at least one of the one or more sub-rules is satisfied.

6. The building management system of claim 1, wherein the one or more values are first one or more values and the fault is a first fault, and wherein the processing circuit is further configured to:

adjust the threshold of the constant;
receive second one or more values associated with the one or more equipment points;
determine the constant of the one or more constants is satisfied responsive to determining the one or more values satisfy the adjusted threshold of the constant;
determine the sub-rule of the one or more sub-rules is satisfied responsive to determining the constant is satisfied;
determine the rule is satisfied responsive to determining the sub-rule is satisfied; and
identify a second fault in the piece of building equipment responsive to determining the rule is satisfied.

7. A method for monitoring equipment status by a building management system, the method comprising:
generating, by a processing circuit, one or more constants for a piece of building equipment based on thresholds and device specific templates, the constants comprising equation based relationships between values and thresholds;
generating, by the processing circuit, one or more sub-rules based on the one or more constants and one or more equipment points, the sub-rules comprising equation based relationships between the one or more constants and the one or more equipment points;
generating, by the processing circuit, a rule based on the one or more sub-rules and the one or more equipment points, the rule comprising an equation based relationship between the one or more sub-rules and the one or more equipment points and indicates whether the piece of building equipment is experiencing a fault;
receiving, by the processing circuit, one or more values associated with the one or more equipment points;
determining, by the processing circuit, a constant of the one or more constants is satisfied responsive to determining the one or more values satisfy a threshold of the constant;
determining, by the processing circuit, a sub-rule of the one or more sub-rules is satisfied responsive to determining the constant is satisfied;
determining, by the processing circuit, the rule is satisfied responsive to determining the sub-rule is satisfied; and
identifying, by the processing circuit, a fault in the piece of building equipment responsive to determining the rule is satisfied.

8. The method of claim 7, the method further comprising determining one or more diagnostics based on a fault by:
determining sub-rules and constants that the rule is based on that are responsible for indicating the fault; and
generating a diagnostic based on the determined sub-rules and constants.

9. The method of claim 8, the method further comprising determining reasons for the fault occurring based on the determined sub-rules and constants and one or more fault reasons associated with the determined sub-rules and constants.

10. The method of claim 7, the method further comprising:
generating a plurality of rules based on the one or more sub-rules;
determining a plurality of faults based on the plurality of rules and determining a length of time that each of the plurality of faults has been active; and
generating a plurality of diagnostics based on the plurality of faults.

11. The method of claim 10, the method further comprising generating a diagnostic list comprising the plurality of diagnostics ordered based on the determined lengths of time that each of the faults associated with the respective diagnostic has been active.

12. The method of claim 10, the method further comprising generating a work order for a first fault of the plurality of faults in response to determining that the first fault has existed for at least a predefined amount of time or that the first fault has occurred at least a predefined number of times.

13. A building management controller for monitoring equipment status, the building management controller comprising a processing circuit configured to:
generate one or more constants for a piece of building equipment based on thresholds and device specific templates, the constants comprising equation based relationships between values and thresholds;
generate one or more sub-rules based on the one or more constants and one or more equipment points, the sub-rules comprising equation based relationships between the one or more constants and the one or more equipment points;
generate a rule based on the one or more sub-rules and the one or more equipment points, the rule comprising an equation based relationship between the one or more sub-rules and the one or more equipment points and indicates whether the piece of building equipment is experiencing a fault;
receive one or more values associated with the one or more equipment points;
determine a constant of the one or more constants is satisfied responsive to determining the one or more values satisfy a threshold of the constant;
determine a sub-rule of the one or more sub-rules is satisfied responsive to determining the constant is satisfied;
determine the rule is satisfied responsive to determining the sub-rule is satisfied;
identify a fault in the piece of building equipment responsive to determining the rule is satisfied; and
determine one or more diagnostics based on the identified fault by:
identifying a diagnostic that corresponds to the sub-rule of the one or more sub-rules; and
generating the diagnostic responsive to satisfaction of the sub-rule causing the rule to be satisfied and the fault to be identified.

14. The building management controller of claim 13, wherein the processing circuit is configured to determine reasons for the fault occurring based on the determined sub-rule and constant and one or more fault reasons associated with the determined sub-rule and constant.

15. The building management controller of claim 13, wherein the processing circuit is configured to:
generate a plurality of rules based on the one or more sub-rules;
determine a plurality of faults based on the plurality of rules and determine a length of time that each of the plurality of faults has been active; and
generate a plurality of diagnostics based on the plurality of faults.

16. The building management controller of claim 15, wherein the processing circuit is configured to generate a diagnostic list comprising the plurality of diagnostics ordered based on the determined lengths of time that each of the plurality of faults has been active.

17. The building management controller of claim 15, wherein the processing circuit is configured to generate a work order for a first fault of the plurality of faults in response to determining that the first fault has existed for at least a predefined amount of time or that the first fault has occurred at least a predefined number of times.

\* \* \* \* \*